United States Patent
Jiang et al.

(10) Patent No.: US 11,372,627 B2
(45) Date of Patent: Jun. 28, 2022

(54) SYSTEM AND METHOD FOR PROVIDING INTEGRATED DEVELOPMENT ENVIRONMENT (IDE) FOR PROGRAMMABLE SOFTWARE SYSTEM

(71) Applicant: ALIBABA GROUP HOLDING LIMITED, Grand Cayman (KY)

(72) Inventors: Long Jiang, Hangzhou (CN); Jianyi Meng, Hangzhou (CN); Chunqiang Li, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 17/112,923

(22) Filed: Dec. 4, 2020

(65) Prior Publication Data
US 2021/0173620 A1    Jun. 10, 2021

(30) Foreign Application Priority Data

Dec. 10, 2019   (CN) .......................... 201911258318.9

(51) Int. Cl.
*G06F 8/36*   (2018.01)
*G06F 8/20*   (2018.01)
*G06F 8/61*   (2018.01)

(52) U.S. Cl.
CPC .................. *G06F 8/36* (2013.01); *G06F 8/20* (2013.01); *G06F 8/62* (2013.01)

(58) Field of Classification Search
CPC .................. G06F 8/36; G06F 8/20; G06F 8/62
(Continued)

(56) References Cited

U.S. PATENT DOCUMENTS 6,256,773 B1 * 7/2001 Bowman-Amuah ..... G06F 8/71
707/999.203
6,662,357 B1 * 12/2003 Bowman-Amuah ..... G06F 8/20
717/120
(Continued)

FOREIGN PATENT DOCUMENTS

WO    2019/120282 A1    6/2019

OTHER PUBLICATIONS

Karsai et al, "Model-Integrated Development of Embedded Software", IEEE, pp. 145-164 (Year: 2003).*
(Continued)

*Primary Examiner* — Anil Khatri

(57) ABSTRACT

Embodiments of this specification disclose a system and a method for providing an embedded integrated development environment (IDE). The system may include a server interface; an index data storage, configured to store application index data; a component data storage, configured to store component dependency data; and an access control module, configured to: receive a first access request through the server interface from a terminal device; retrieve the application index data according to the first access request from the index data storage to determine a first application component; retrieve the component dependency data according to the first application component from the component data storage to determine a resource component on which the first application component depends; and send the first application component and the resource component to the terminal device through the server interface.

20 Claims, 11 Drawing Sheets

(58) Field of Classification Search
USPC .................................................. 717/104–121
See application file for complete search history.

(56) References Cited

U.S. PATENT DOCUMENTS

| | | | | |
|---|---|---|---|---|
| 6,934,722 B1* | 8/2005 | Goshey | ............... | G06F 11/1458 717/109 |
| 6,948,150 B1* | 9/2005 | Pepin | ........................ | G06F 8/36 717/107 |
| 7,434,202 B2* | 10/2008 | Kramer | ..................... | G06F 8/71 717/102 |
| 7,493,594 B2* | 2/2009 | Shenfield | .................. | G06F 8/10 717/102 |
| 7,562,347 B2 | 7/2009 | Baumgart et al. | | |
| 7,657,868 B2 | 2/2010 | Shenfield et al. | | |
| 7,676,785 B2 | 3/2010 | Loksh et al. | | |
| 7,779,385 B2* | 8/2010 | Hegde | ........................ | G06F 8/61 717/107 |
| 7,895,566 B2* | 2/2011 | Shenfield | .................. | G06F 8/20 717/106 |
| 7,953,767 B2 | 5/2011 | Shaburov | | |
| 8,121,874 B1* | 2/2012 | Guheen | ................ | G06Q 10/087 705/28 |
| 8,126,937 B2 | 2/2012 | Shaburov | | |
| 8,171,452 B2* | 5/2012 | Crasovan | .................. | G06F 8/36 717/111 |
| 8,291,408 B1 | 10/2012 | Czymontek | | |
| 8,312,446 B2* | 11/2012 | Kaminsky | ................. | G06F 8/71 717/175 |
| 8,316,344 B2* | 11/2012 | Kaetker | .................... | G06F 8/10 717/106 |
| 8,321,859 B2* | 11/2012 | Shapiro | ..................... | G06F 8/63 717/175 |
| 8,341,595 B2 | 12/2012 | Arner et al. | | |
| 8,352,903 B1 | 1/2013 | Friedman | | |
| 8,370,794 B2* | 2/2013 | Moosmann | ............... | G06F 8/10 717/106 |
| 8,392,880 B2 | 3/2013 | Chadian et al. | | |
| 8,429,203 B2 | 4/2013 | Perez et al. | | |
| 8,615,712 B2* | 12/2013 | Porter | ........................ | G06F 8/38 715/744 |
| 8,707,277 B2* | 4/2014 | Bickle | ...................... | G06F 8/423 717/136 |
| 8,719,776 B2* | 5/2014 | Eteminan | ................... | G06F 8/34 717/124 |
| 9,038,018 B2* | 5/2015 | Ma | ............................ | G06F 8/30 717/109 |
| 9,489,418 B2 | 11/2016 | Brodsky et al. | | |
| 10,048,948 B2 | 8/2018 | Davis et al. | | |
| 2006/0236254 A1 | 10/2006 | Mateescu et al. | | |
| 2013/0289749 A1 | 10/2013 | Mody et al. | | |
| 2015/0127575 A1 | 5/2015 | Heizmann et al. | | |
| 2017/0090883 A1 | 3/2017 | Zhang | | |
| 2018/0019878 A1 | 1/2018 | Jiang | | |
| 2018/0173521 A1 | 6/2018 | Zhan et al. | | |
| 2019/0079700 A1 | 3/2019 | Gao et al. | | |
| 2019/0244294 A1 | 8/2019 | Shao et al. | | |
| 2019/0251018 A1 | 8/2019 | Jin et al. | | |

OTHER PUBLICATIONS

Pilkington et al, "ESIDE: An Integrated Development Environment for Component-Based Embedded Systems", IEEE, pp. 305-314 (Year: 2009).*
Gill et al, "Dependency and Interaction Oriented Complexity Metrics of Component-Based Systems", ACM, pp. 1-8 (Year: 2008).*
Nguyen et al, "Predicting Vulnerable Software Components with Dependency Graphs", ACM, pp. 1-8 (Year: 2010).*
Yacoub et al, "A Scenario-Based Reliability Analysis Approach for Component-Based Software", IEEE, pp. 465-480 (Year: 2004).*
Sharma et al, "Dependency Analysis for Component-Based Software Systems", ACM, pp. 1-9 (Year: 2009).*
Qu et al, "A Framework for Dynamic Analysis Dependency in Component-Based System", IEEE, pp. 250-254 (Year: 2010).*
Written Opinion and International Search Report for PCT Application No. PCT/US2020/063493 dated Mar. 4, 2021.

* cited by examiner

| Application field 607 | Application category 606 | Application identifier 603 | Chip identifier 604 | Board identifier 605 |
|---|---|---|---|---|

FIG. 6a

| Index number 611 | Application category 612 | Application identifier 613 | Board identifier 614 | Board storage location 615 | Chip identifier 616 | Chip Storage location 617 | Kernel component identifier 618 | Kernel component storage location 619 | ... |
|---|---|---|---|---|---|---|---|---|---|

FIG. 6b

SYSTEM AND METHOD FOR PROVIDING INTEGRATED DEVELOPMENT ENVIRONMENT (IDE) FOR PROGRAMMABLE SOFTWARE SYSTEM

CROSS-REFERENCE TO RELATED APPLICATION

This application is based on and claims priority to and benefit of Chinese Patent Application No. 201911258318.9, filed with the China National Intellectual Property Administration on Dec. 10, 2019, and entitled "system and method for providing integrated development environment." The entire content of the above-identified application is incorporated herein by reference in its entirety.

TECHNICAL FIELD

This application relates to the field of embedded development, and in particular, to a system and a method for providing an embedded integrated development environment (IDE) in an embedded development process.

BACKGROUND

Embedded development refers to development and construction of a specific programmable software system in a specific hardware environment. During embedded development, a series of operations such as code writing, compiling, downloading, and debugging are required. An embedded IDE integrates the operations, for an embedded developer to install on a terminal device a system for providing an embedded IDE, and use the system for daily development.

An existing system for providing an embedded IDE allows a specified network resource to be obtained from a server into a system. The specified network resource includes software code used to support a specific hardware environment. In embedded development, a specific hardware environment usually includes the following hardware components shown in FIG. 1:

(1) a chip pin 101, configured to electrically connect a system-on-a-chip 103 to a circuit board, and transmit a signal through the chip pin 101;

(2) other external hardware 102, soldered on the circuit board, as external hardware that can be used;

(3) a system-on-a-chip (SoC) 103, including an internal intellectual property (IP) core, a peripheral IP core, and usually a storage device such as a static random access memory (SRAM) or a flash memory; and (4) a circuit board 104, configured to carry the foregoing components, and support signal transmission between the components.

Software code that usually needs to be downloaded to the system is shown in FIG. 2, and includes an application module 203, a board module 202, and a chip module 201. The application module 203 is example code that is low in coupling with a hardware component and used to implement a specific scenario. The chip module 201 includes code for initializing the IP core and the storage device that are included in the system-on-a-chip. The board module 202 includes code for initializing the circuit board and the chip pin. If other additional hardware devices are soldered on the circuit board, the board module 202 also needs to include drivers for the hardware devices.

Referring to FIG. 3, a server organizes, in the following manner, software code for supporting a hardware environment: A chip set component 300 may be considered as an independent package file. The package file includes a module 1 to a module N. The module 1 to the module N each include one chip module 201, and further include one or more application modules 203 and a board module 202 that correspond to the chip module 201. It should be noted that, the module herein is only a logical unit configured to implement a specific function. Therefore, when software code of a specific hardware environment needs to be downloaded, a system needs to download the chip set component 300 as a whole.

However, such a chip-dominant manner of organizing and downloading network resources has the following problems: First, as the Internet of Things (IoT) develops, some IoT products need to meet only a specific application scenario, for example, meet only a specific chip type, without needing to cover all possible chip types. Second, during chip-oriented downloading of network resources, an entire chip set component needs to be downloaded, resulting in oversized downloaded resources, including many redundant resources, and consequently reducing development efficiency.

SUMMARY

In view of this, this specification provides a system and a method for providing an embedded IDE, to resolve the foregoing problem.

To achieve the objective, according to a first aspect of this specification, an embodiment of this specification provides a system for providing an embedded IDE, deployed on a terminal device, where the terminal device communicates with a server, and the system includes: an interface module, configured to provide various interfaces for interaction with the server; and an interface control module, comprising a graphic interface, and configured to: receive application specifying information of an application component through the graphic interface, send a first access request to the server through the interface module according to the application specifying information, and obtain, from the server in response to the first access request, a first application component matching the application specifying information and a resource component on which the first application component depends from the server.

In an embodiment, the interface control module is further configured to the interface control module is further configured to: send a second access request to the server for obtaining corresponding data of a plurality of application fields, application categories, and application identifiers, and display, in the graphic interface, a plurality of application fields, application categories, and application identifiers according to correspondence data to receive application specifying information of the application component, wherein the application specifying information comprises an application index.

In an embodiment, a browser is embedded in the graphic interface, and the plurality of application fields, application categories, and application identifiers are displayed as components on the browser.

According to a second aspect, an embodiment of this specification provides a method for providing an embedded IDE, where the method is applied to a server, and the method includes: receiving, by a server, a first access request from a terminal device; retrieving, by the server, an application index according to the first access request to determine an application component; retrieving, by the server, component dependency data according to the application component, the component dependency data describing dependency between the application component and one or more other components; determining, by the server, a resource component on which the application component depends based on the retrieved component dependency data; and sending, by the server, the application component and the resource component to the terminal device.

In an embodiment, the first access request comprises application specifying information obtained by: sending, by the server to the terminal device, correspondence data of a plurality of application fields, application categories, and application identifiers for the terminal device to display the plurality of to-be-selected application fields, application categories, and application identifiers according to the correspondence data and receive the application specifying information of the application component.

In an embodiment, the method further includes: receiving, by the server, a second access request from the terminal device for obtaining the correspondence data of the plurality of application fields, application categories, and application identifiers.

In an embodiment, the receiving a second access request from the terminal device comprises: updating, by the server, the correspondence data stored thereon; and receiving, by the server, the second access request from the terminal device for obtaining the updated correspondence data.

In an embodiment, the receiving a second access request from the terminal device comprises: receiving, by the server, the second access request from the terminal device in real-time for obtaining the correspondence data.

In an embodiment, the method further includes receiving, by the server, a third access request from the terminal device for obtaining data of a board component; and sending, by the server, the data of the board component to the terminal device for displaying a plurality of to-be-selected board components in the graphic interface according to the data of the board component.

In an embodiment, the method further includes receiving, by the server, a third access request from the terminal device for obtaining data of a chip component; and sending, by the server, the data of the chip component to the terminal device for displaying a plurality of to-be-selected chip components in the graphic interface according to the data of the chip component.

In an embodiment, the resource component on which the first application component depends comprises one or more of the following components: a chip component, a board component, a middleware component, and a kernel component.

According to a third aspect, an embodiment of this specification provides a resource management system, deployed on a server, where the server communicates with a plurality of terminal devices, the server is deployed with various application components and various resource components on which the application components depend, and the resource management system includes: a server interface, configured to provide a plurality of interaction interfaces to communicate with the plurality of terminal devices; an index data storage, configured to store application index data of the plurality of application components; a component data storage, configured to store component dependency data describing dependency relationships between the plurality of application components and the plurality of resource components; and an access control module, configured to: receive a first access request through the server interface from a terminal device; retrieve the application index data according to the first access request from the index data storage to determine a first application component; retrieve the component dependency data according to the first application component from the component data storage to determine a resource component on which the first application component depends; and send the first application component and the resource component to the terminal device through the server interface.

In the system for providing an embedded IDE provided in the embodiments of this specification, a first application component is downloaded according to application specifying information of an application component, and a resource component related to the first application component is downloaded, without a need to download excess resources, thereby improving efficiency of project construction and loading in embedded development, and further improving development efficiency. Further, server-side resources are divided into various components with a finer granularity than that of chip development kits in existing technologies, which not only facilitates reuse of the various components, but also enables use of the components to more flexibly build new applications, thereby helping rapidly form various new applications.

BRIEF DESCRIPTION OF THE DRAWINGS

The foregoing and other objectives, features, and advantages of this specification are becoming more obvious through the descriptions of the embodiments of this specification made with reference to the following accompanying drawings. In the accompanying drawings:

FIG. 6a shows a data structure of an example application data unit, according to an embodiment of this specification;

FIG. 6b shows a data structure of an example component data unit, according to an embodiment of this specification;

DETAILED DESCRIPTION OF THE INVENTION

Figure 1:
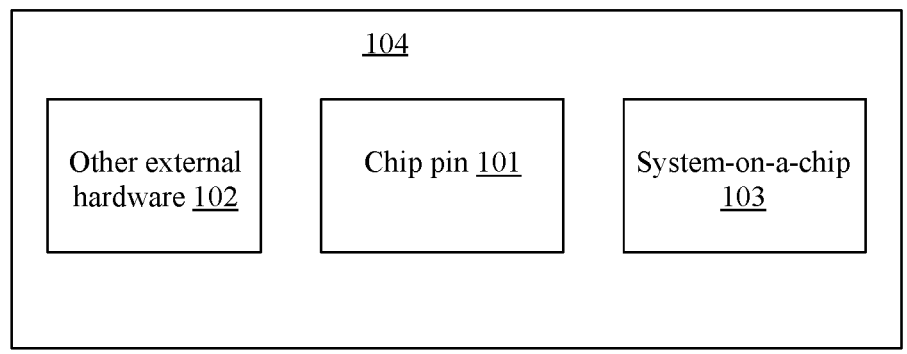
FIG. 1 shows hardware devices included in a hardware environment required for an embedded IDE.

This specification is described below based on embodiments, but this specification is not merely limited to the embodiments. Some specified details are described in the following detailed descriptions of this specification. For a person skilled in the art, this specification can also be completely understood without the detailed descriptions. To avoid confusion with the essence of this specification from being confused, well-known methods, procedures, and processes are not described in detail. In addition, the accompanying drawings are not necessarily drawn to scale.

Technical terms used herein are described as follows:

An SRAM is a type of random access memory (RAM). "Static" means that data stored in such a memory can be maintained constantly as long as the memory is powered on.

A flash memory (Flash EPROM) is a form of electronically erasable programmable read-only memory. The flash memory allows a plurality of times of erasing or writing during operation and is non-volatile. The flash memory differs from a conventional electronically erasable programmable read-only memory in that the flash memory allows data erasure in larger blocks while the conventional electronically erasable programmable read-only memory allows only erasure and rewriting at a single storage location.

An IP core is a manufacturer-provided reusable module in the form of a logical unit or a chip design.

Usually, a system for providing an embedded IDE uses a "project" to manage a resource in an embedded IDE. The "project" includes a source code list, a compilation-related configuration, a debug startup configuration, a download configuration, and the like. In the embedded IDE, hardware adaptability further needs to be considered. Therefore, the "project" further needs to include code that supports a specific hardware environment. The specific hardware environment may be selected according to an actual application requirement and integrated on a circuit board. The circuit board generally includes a series of hardware such as a processor, a memory, an input device, an output device, a data path/bus, and an external resource interface. Such a circuit board that integrates a series of hardware is also referred to as a board.

The core idea of this specification is as follows: First, a chip set component of a server is divided into various components. For example, a chip module, a board module, and an application module that are included in the chip set component are divided into a plurality of chip components, a plurality of board components, and a plurality of application components according to features such as a chip category, a board category, and an application category. Then, an "application-oriented" concept is introduced into the system for providing an embedded IDE, and an application requirement is provided in a project. Subsequently, resource index data is retrieved according to the application requirement, to determine an application component matching the application requirement. Then, the application component and resource components (including a board component and a chip component) on which the application component depends are downloaded to the project. In this way, a constructed application project includes components matching the application requirement, and does not include other irrelevant components. In addition, as the application requirement changes, a component that has been downloaded to the project may be uninstalled, or a new component may be installed. In such a solution, a component is downloaded based on an application requirement, thereby avoiding downloading of a redundant component, further preventing a project from becoming huge due to impact of the redundant component, and avoiding impact on an operation such code editing, code compilation, and code execution.

Figure 4:
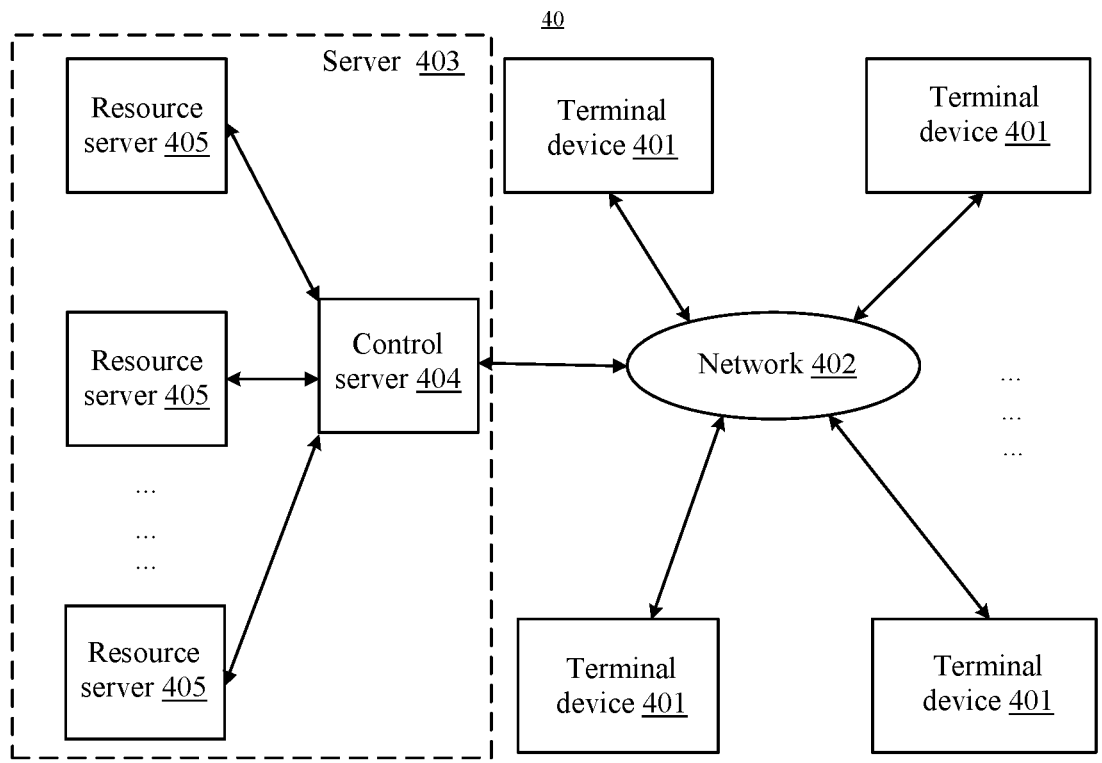
FIG. 4 is a diagram of an application scenario, according to an embodiment of this specification.

FIG. 4 is a diagram of an application scenario, according to an embodiment of this specification. As shown in FIG. 4, a system 40 may include a plurality of terminal devices 401 and a server 403 that are coupled through a network 402.

The terminal device 401 may be constructed based on various models of processors currently on the market, and include various types of devices such as a memory and an input/output device. Various operating systems and various application software are installed on the terminal device 401. The operating system is, for example, a WINDOWS™ operating system, a UNIX™ operating system, a Linux™ operating system, or a real-time operating system (RTOS). The application software is, for example, a browser, video player software, communications software, and various research and development tools.

The terminal device 401 may communicate with the network 402 in various manners. The network 402 may be based on one of various communications technologies or a combination of a plurality of types of communications technologies implemented by using switching signals, including but not limited to, a wired technology using an electrical and/or optical conductive cable, and a wireless technology using infrared or radio frequency, and/or a wireless technology in another form. In different application scenarios, the network 402 may be the Internet, a wide area network, or a local area network. For example, the network 402 is a proprietary network of a company. Alternatively, the network 402 may be a wired network or a wireless network.

Each terminal device 401 may download various network resources from the server 403 through the network 402. In this example, the server 403 includes a control server 404 and a plurality of resource servers 405. The control server 404 is configured to control access of the terminal devices 401 to the network resource. For example, for a resource request provided by a specific terminal device, the control server 404 checks whether the specific terminal device has access permission, and if the specific terminal device has access permission, the control server 404 obtains, from a corresponding resource server by using a server index, a network resource requested by the specific terminal device, and delivers the network resource to the specific terminal device. The resource server 405 stores various network resources. Certainly, a control system in which a single server stores various network resources and controls access to a network resource may alternatively be used.

The terminal devices 401 are further deployed with embedded development software, to provide an embedded IDE, to facilitate development of an embedded developer. The embedded development software may be pre-installed on the terminal device, or downloaded by the embedded developer from the server 403 to the terminal device 401. Each terminal device 401 may be defined as a device that enables development by an embedded developer, such as a PC, a desktop computer, a notebook computer, or a palmtop computer.

Figure 2:
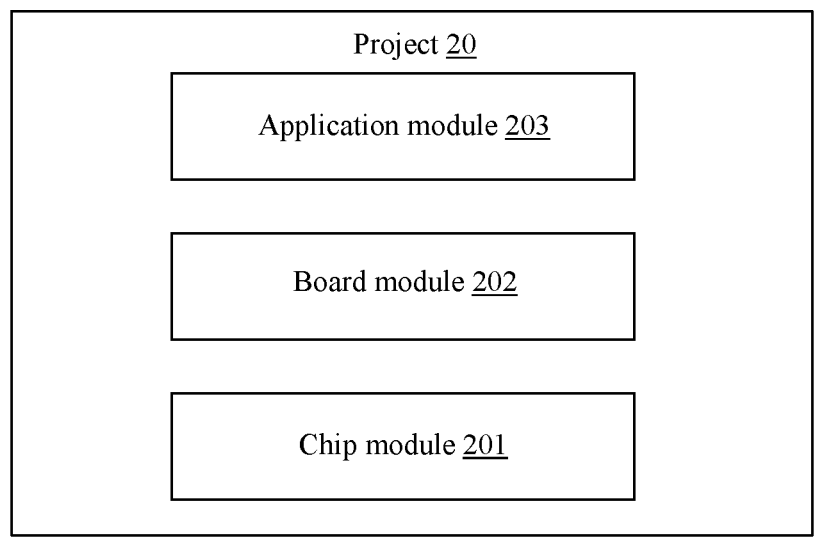
FIG. 2 shows modules included in a project of an embedded IDE.
Figure 3:
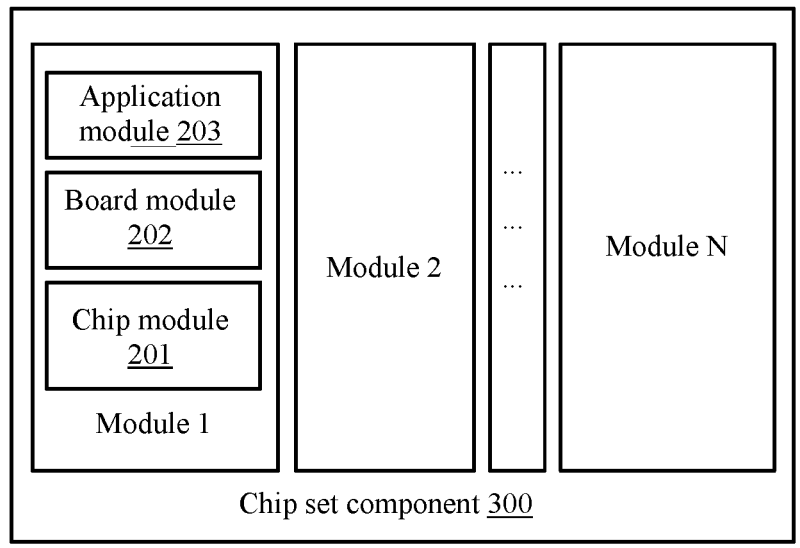
FIG. 3 shows a manner in which an existing system for providing an embedded development environment organizes software code for supporting a specific hardware environment.

Each resource server 405 on the server 403 stores various network resources. According to existing technologies, various chip set components shown in FIG. 2 are stored in the resource server 405 as a whole, and embedded development software deployed on each terminal device 401 downloads required network resources through the control server 404. However, according to the embodiments of this specification, on one hand, on the server 403, in a control system, network resources are organized in a component-based management manner and subdivided and managed according to component categories, a network resource on which each type of application depends is described, an access request from each terminal device 401 is received, and downloading of an application component and a resource component on which the application component depends is controlled according to the access request. On the other hand, on the terminal device 401, in the embedded development software, an application component and a resource component on which the application component depends are downloaded based on an application requirement. For example, an embedded developer provides an application requirement. The embedded development software generates an access request, and sends the access request to the control system of the server 403. The server 403 downloads a required application component and a resource component on which the application component depends to the embedded development software according to the access request.

Optionally, the plurality of resource servers 405 and the control server 404 of the server 403 constitute a cluster server. The control server 404 is deployed with cluster management software, for the resource servers to provide services for an external system in a unified manner.

Figure 5:
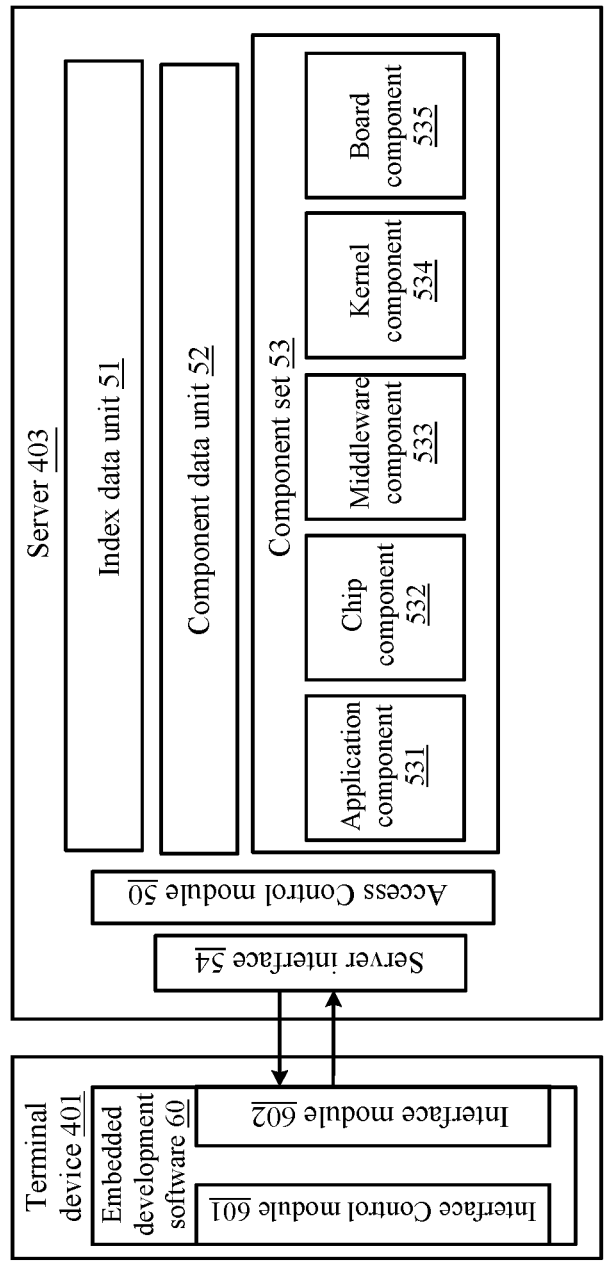
FIG. 5 is a schematic diagram of deployment of various modules on a terminal device and a server shown in FIG. 4, according to an embodiment of this specification.

FIG. 5 is a schematic diagram of deployment of various modules on the terminal device and the server shown in FIG. 4, according to an embodiment of this specification. As shown in FIG. 5, the terminal device 401 is deployed with embedded development software 60, and the software 60 includes an interface control module 601 and an interface module 602. The interface module 602 is configured to provide various interfaces for interaction with the control system of the server. The interfaces include establishing a communication connection, sending an access request, receiving a request result, downloading a network resource, and the like. The interface control module 601 is configured to: provide various graphic interfaces for an embedded developer; receive application specifying information (that is, the application requirement described above) of an application component through a graphic interface; send an access request to the server according to the application specifying information through the interface module 602; and obtain the application component matching the application specifying information and a resource component on which the application component depends from the server.

Still referring to FIG. 5, the server 403 is deployed with a server interface 54, a access control module 50, an index data unit 51, a component data unit 52, and a component set 53. The server interface 54 is configured to provide various interfaces for interaction with the embedded development software 60, to implement communication with the interface module 602. The operations performed by the server interface 54 includes: receiving various access requests, forwarding the access requests to the access control module 50, returning a processing result, and the like. The server interface 54 and the access control module 50 may be deployed on the control server 404 shown in FIG. 4, and configured to obtain an access request, and control, according to the access request, access to and downloading of a network resource. The index data unit 51 stores application index data. The component data unit 52 stores component dependency data. The component dependency data describes a dependency relationship between various components in the component set 53, including a dependency relationship between an application component and another component, and a dependency relationship between other components. The component dependency data may be represented graphically or as data. The component data unit 52 may be located on the control server 404, but this embodiment of this specification is not limited thereto. The component set 53 is a set of various types of component sets, such as an application component 531, a chip component 532, a middleware component 533, a kernel component 534, and a board component 535, as shown in the figure, but this embodiment of this specification is not limited thereto. In this embodiment of this specification, the following settings may be used: One project can include a maximum of one application component 531. One board component 535 exists in one project, configured to provide software support for a board, including chip initialization code, external hardware module driver code, and the like. One chip component 532 exists in one project, is configured to initialize a chip on a board, and further include a link description file used for the entire project. A maximum of one kernel component 534 is included in one project, and it is determined, according to a specific implementation, whether to add the kernel component 534 to the project. If an application requires an RTOS, the component is to be installed. Middleware components 533 are some reusable components configured to support the application, and a project may choose to use or not to use some middleware components according to a specific situation, to complete the specific implementation.

In an embodiment, the embedded development software 60 may send an access request to the server through the interface module 602. The access control module 50 of the server calls a server interface 54 to receive the access request; obtains application information from the access request, where the application information may include information about one or more fields of an application field, an application category, an application identifier, a chip identifier, a board identifier, or the like; retrieves application index data and component dependency data according to the information, to obtain a corresponding application component and a resource component on which the application component depends; and sends the corresponding application component and the resource component on which the application component depends to the embedded development software 60.

In some embodiments, the access control module 50 directly returns an application component and a resource component on which the application component depends to the embedded development software. In another optional implementation, the access control module 50 notifies the embedded development software 60 of storage locations and obtaining manners of an application component and a resource component on which the application component depends. The embedded development software 60 controls whether to download and how to download the components.

In an embodiment, the interface control module 601 presents a plurality of to-be-selected application fields, application categories, and application identifiers to an embedded developer through a graphic interface according to correspondence data of application fields, application categories, and application identifiers, for the developer to select. The correspondence data of application fields, application categories, and application identifiers may be stored in the server, for example, in application index data, or certainly in the terminal device. If the correspondence data is stored in the server, the embedded development software 60 may send an access request to the server in real time as required, to obtain the correspondence data from the server, or may obtain the correspondence data from the server in advance, and store the correspondence data in the terminal device, for use as required. In this way, when the correspondence data in the server is updated, the interface control module 601 sends an access request to the server, and obtains the correspondence data from the server, to update local correspondence data. Alternatively, the correspondence data may be obtained from the server at an initialization stage each time the embedded development software 60 is enabled, and local correspondence data is updated.

In an embodiment, the interface control module 601 creates a project in a wizard manner. As a menu is clicked, a create project wizard pops up, and an application field is specified. Then, various application categories in the application field are displayed in the graphic interface, and an application category is specified. Then, various application components belonging to the application category are displayed in the graphic interface, and an application component is specified. In this process, the interface control module 601 sends a plurality of access requests. The access control module 50 receives the plurality of access requests through the server interface 54, parses out an application field from each of the access requests, retrieves application index data according to the application field, to obtain all application categories in the application field, and returns the application categories to the interface control module 601 through the interface module 602. The interface control module 601 presents all the application fields and all the application categories in the graphic interface, for a user to select an application category. Then, the interface control module 60 constructs and sends an access request again. The access control module 50 receives the access request through the server interface 54, parses out an application category from the access request, retrieves application index data according to the application category, to obtain all application identifiers of the application category, and returns, through the interface module 602, the application identifiers to the interface control module 601 for presentation. Further, the user specifies an application identifier, and constructs and sends an access request. The access control module 50 receives the access request through the server interface 54, parses out the application identifier from the access request, retrieves application index data according to the application identifier, to obtain a corresponding application component, and directly or indirectly returns the application component and a resource component on which the application component depends to the embedded development software.

In an embodiment, a browser may be embedded in the interface control module 601. A graphic component may be displayed by using a browser technology. Application specifying information of the application component is received by using the graphic component. When the browser is embedded, a browser engine graphically presents a web page by using a browser front-end technology, for better presentation, and reuse of network resources. Usually, a web page running in such an embedded browser is a dynamic web page including JavaScript™ source code. When content presented on the web page needs to exchange data with the embedded development software, the following technical solution is commonly used: The embedded development software starts a local server. The browser accesses a resource provided by the local server, and accesses a local server through a network (http/https). Then, the local server may directly call a related function in the embedded development software, to complete a data exchange operation. Certainly, in this specification, the technical solution is not necessarily required to implement an interaction function between the browser and the embedded development software.

In the foregoing embodiment, an application component is downloaded according to application specifying information of the application component that is included in an access request, and a resource component related to the application component is also downloaded, without a need to download a redundant resource, thereby improving efficiency of project construction and loading in embedded development, and further improving development efficiency.

Further, server-side resources are divided into various components with a finer granularity than that of a chip set component in existing technologies, which not only facilitates reuse of the various components, but also enables use of the components to more flexibly build new applications, thereby helping rapidly form various new applications. In addition, an embedded developer can better focus on development of a single component, thereby providing more efficient components.

The foregoing modules are obtained through division at a software level, a person skilled in the art can definitely provide a module combination different from the foregoing one, provided that the guiding spirit of this specification is understood. The module combination obtained accordingly should also fall within the protection scope of this specification.

FIG. 6*a* shows a data structure of an example index data unit, according to an embodiment of this specification. The data structure shown in FIG. 6*a* is a table structure, including an application field 607, an application category 606, an application identifier 603, a chip identifier 604, and a board identifier 605. The access control module 50 performs matching according to application specifying information in an access request, to determine a corresponding application identifier. The application specifying information may include one or more of an application field, an application category, an application identifier, a chip identifier, and a board identifier. The application identifier is an identifier of an application component. The chip identifier is an identifier of a chip component. The board identifier is an identifier of a board component. Certainly, a data structure of application index data is not limited thereto.

FIG. 6*b* shows a data structure of an example component data unit, according to an embodiment of this specification. The data structure shown in FIG. 6*b* is a table structure, including an index number 611, an application category 612, an application identifier 613, a board identifier 614, a board storage location 615, a chip identifier 616, a chip storage location 617, a kernel component identifier 618, and a kernel component storage location 619. The board identifier 614 and the board storage location 615 correspond to the board component 535 in the component set 53. That is, a board component 535 stored in the component set 53 may be found according to the board identifier 614 and the board storage location 615. The chip identifier 616 and the chip storage location 617 correspond to the chip component 532 in the component set 53. That is, a chip component 532 stored in the component set 53 may be found according to the chip identifier 616 and the chip storage location 617. The kernel component identifier 618 and the kernel component storage location 619 correspond to the kernel component 534 in the component set 53. The component data unit may further include a dependency relationship that is not shown, for example, a dependency relationship on the middleware component 533.

The data structures shown in FIG. 6*a* and FIG. 6*b* may alternatively be combined into one. Certainly, the foregoing data structures may be divided into more data structures. The embodiments of this specification are not limited to the foregoing data structures.

Figure 6C:
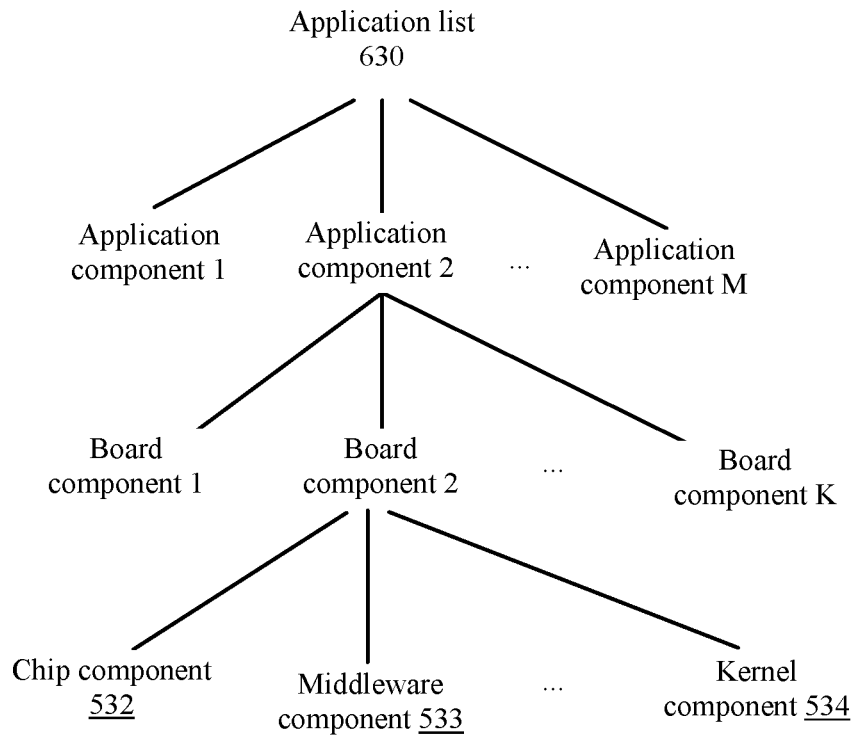
FIG. 6c shows a data structure of another example data unit configured to store both application index data and component dependency data, according to an embodiment of this specification.

FIG. 6*c* shows a data structure of another example data unit configured to store both application index data and component dependency data, according to an embodiment of this specification. The data structure is a tree structure. An application list serves as a root node, and includes a plurality of application nodes. Each application node describes attribute information of one application component. Each application node includes a plurality of board nodes. Each board node is used to describe attribute information of one board component, and so on. The attribute information of the application component includes, for example, an application identifier, an application category, a storage location of the application component, and a board identifier on which the application component depends. An advantage of representing a dependency relationship in a tree structure is that a dependency relationship can be more flexibly adjusted. In a table structure, once the table structure is determined, fields included in the table structure are fixed, making it difficult to adjust the table structure and data. However, in terms of a tree structure, attribute information and a quantity of nodes of the tree structure may be easily adjusted, and flexible adjustment of the tree structure is valuable for network resource management. In addition, it should be further noted that, according to the embodiments of this specification, a tree structure may alternatively be constructed entirely on application components. For example, a root node of the tree structure includes a plurality of application nodes, and a secondary node of the application node includes another node on which the secondary node depends, for example, a node for describing a board component, a node for describing a chip component, or a node for describing a kernel component. Certainly, either the table structure or the tree structure is used for storing component dependency data, and therefore, may be designed according to an actual componentization situation.

Figure 7A:
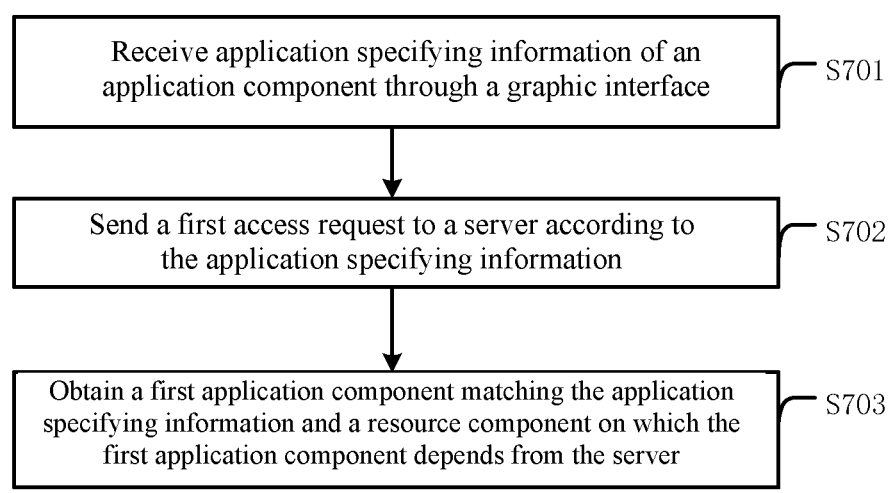
FIG. 7a and FIG. 8a are each a flowchart of a method for providing an embedded IDE, according to an embodiment of this specification.

FIG. 7a is a flowchart of a method for providing an embedded IDE, according to an embodiment of this specification. The method is applied to a terminal device, and the terminal device communicates with a server. The following steps are included.

Step S701: Receive application specifying information of an application component through a graphic interface.

Step S702: Send a first access request to the server according to the specified information.

Step S703: Obtain a first application component matching the application specifying information and a resource component on which the first application component depends from the server.

In this embodiment, application specifying information of an application component is received through a graphic interface of embedded development software. The application specifying information may include one or more of fields such as an application field, an application category, an application identifier, a chip identifier, and a board identifier. A first access request is organized according to the specified information. The first access request is sent to a server, and a first application component matching the application specifying information and a resource component on which the first application component depends are accordingly obtained from the server.

Figure 7B:
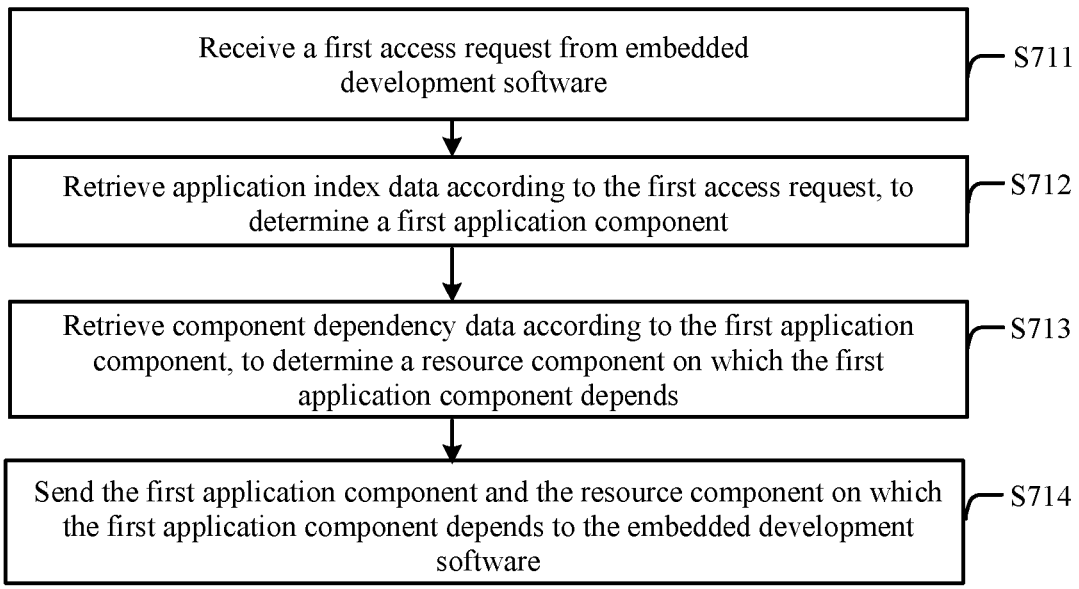
FIG. 7b and FIG. 8b are each a flowchart of a resource management method, according to an embodiment of this specification.

FIG. 7b is a flowchart of a resource management method, according to an embodiment of this specification. The resource management method is applied to a server. The server is deployed with an application component and a resource component on which the application component depends, for example, a chip component, a board component, a kernel component, or a middleware component. The resource management method includes the following steps.

Step S711: Receive a first access request from embedded development software. The first access request may include one or more of fields such as an application field, an application category, an application identifier, a chip identifier, and a board identifier.

Step S712: Retrieve application index data according to the first access request, to determine a first application component. After receiving the first access request, the server parses a field therein, to obtain application specifying information herein, and accordingly retrieves the application index data. For example, component storage locations of one or more application components are obtained and/or an application identifier corresponding to the first application component is obtained according to an application category in the first access request. The application index data may be pre-established and stored in the server.

Step S713: Retrieve component dependency data according to the first application component, to determine a resource component on which the first application component depends. According to this step, identifiers of a board component and a chip component on which the first application component depends may be obtained first. If the first application component further depends on other components in addition to the chip component and the board component, respective identifiers of the components may also be obtained by retrieving the component dependency data.

Step S714: Send the first application component and the resource component on which the first application component depends to the embedded development software. In an optional example, the server may read the components from storage locations of one or more first application components, and send the components to embedded development software of a terminal device. In another optional example, when retrieving the component dependency data, the server reads the storage locations of the first application components, and sends the storage locations to embedded development software of a terminal device. The embedded development software downloads the components, and the components are installed in the embedded development software.

Figure 8A:
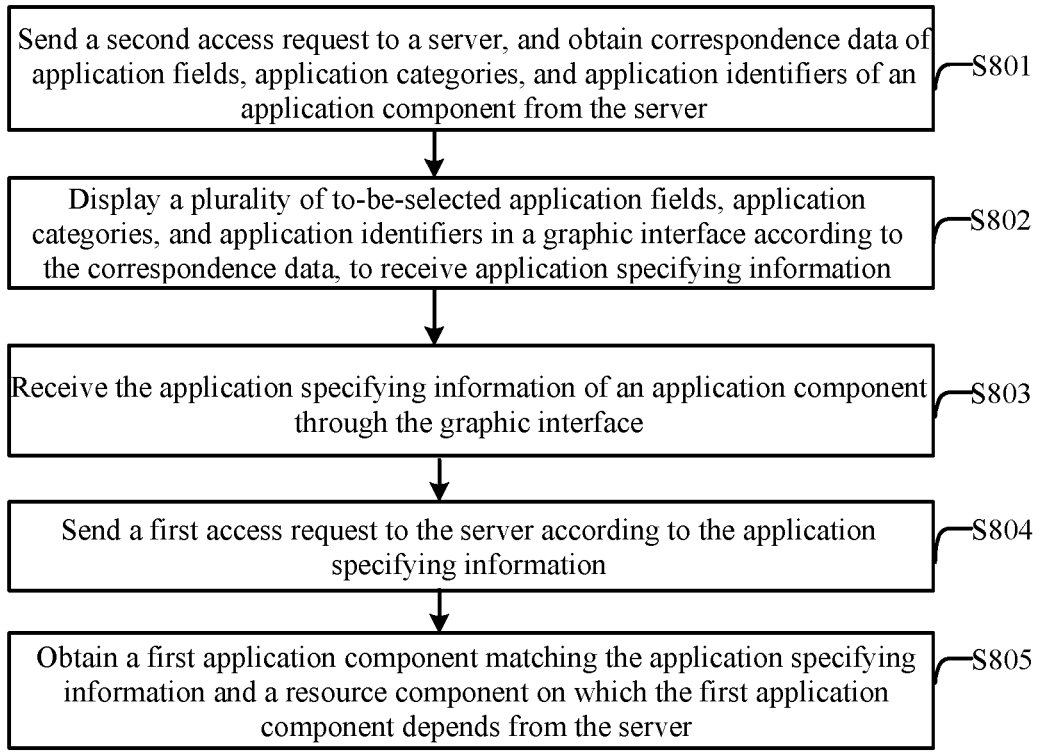

FIG. 8a is a flowchart of a method for providing an embedded IDE, according to an embodiment of this specification. Steps S803 to S805 in this embodiment are the same as the steps S701 to S703 in FIG. 7a. Details are not described herein again. This embodiment further includes steps S801 and S802. The two steps are used to obtain correspondence data in a project of embedded development software, to enable presentation of the correspondence in the graphic interface, for an embedded developer to select.

Step S801: Send a second access request to the server, and obtain correspondence data of application fields, application categories, and application identifiers of the application component from the server.

Step S802: Display a plurality of to-be-selected application fields, application categories, and application identifiers in the graphic interface according to the correspondence data, to receive the application specifying information of the application component.

In this embodiment, correspondence data is obtained from a server, and the correspondence data is displayed as various graphic components in a graphic interface, for an embedded developer to select based on the graphic components, without a need to input information, thereby facilitating embedded development.

Figure 8B:
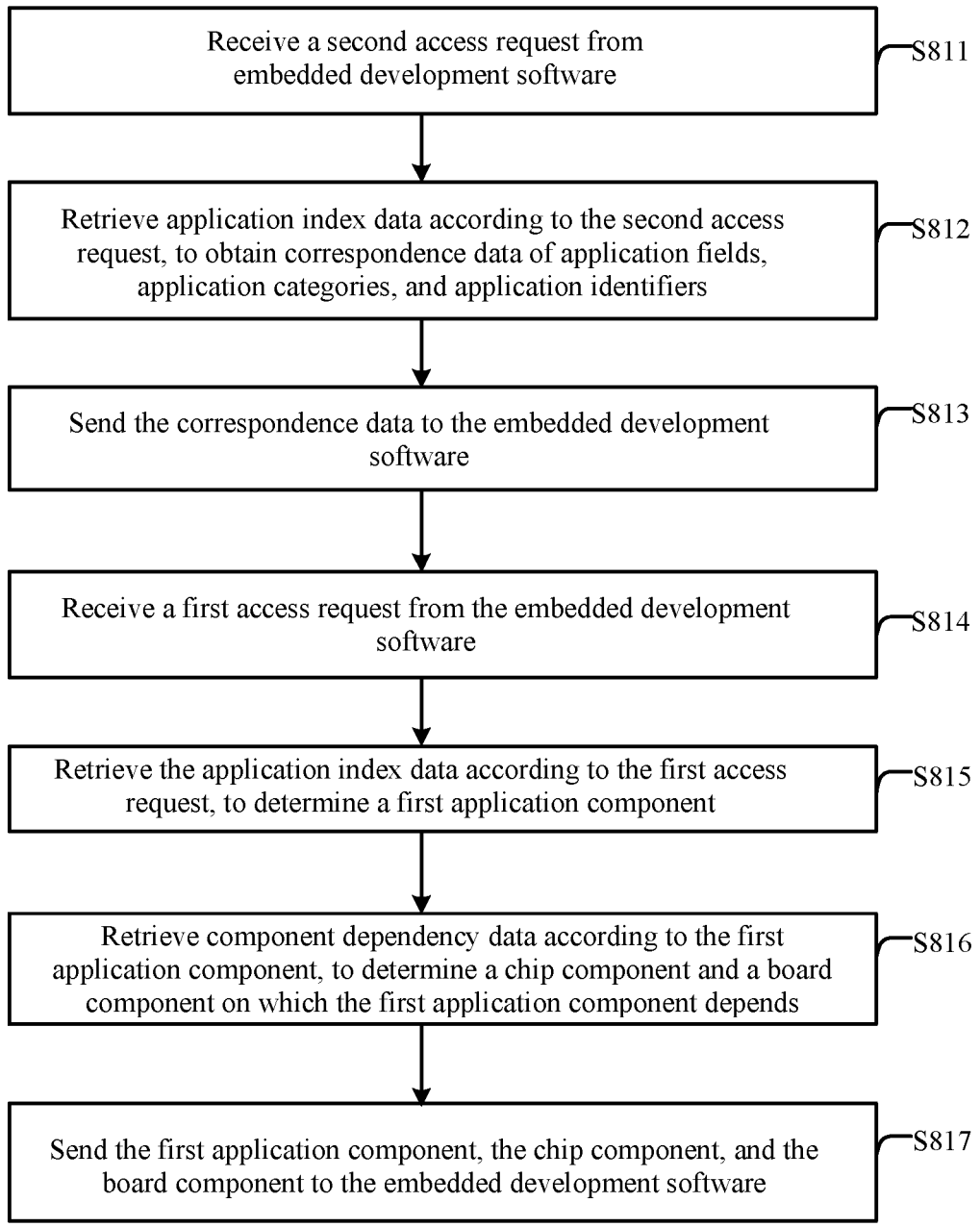

FIG. 8b is a flowchart of a resource management method, according to an embodiment of this specification. Steps S814 to S817 in this embodiment correspond to the steps S711 to S714 in FIG. 7b. Details are not described herein again. This embodiment further includes steps S811 to S813. The three steps describes how to obtain correspondence data through retrieval in the server based on an access request.

Step S811: Receive a second access request from the embedded development software. The second access request is used to obtain correspondence data of application fields, application categories, and application identifiers.

Step S812: Retrieve the application index data according to the second access request, to obtain the correspondence data of application fields, application categories, and application identifiers. The correspondence data of application fields, application categories, and application identifiers is stored in the server, for a user to download the correspondence data locally from the server during project creation in the embedded development software. An advantage of this manner is that when the correspondence data changes, data can be downloaded again from the server.

Step S813: Send the correspondence data to the embedded development software. After obtaining the correspondence data, the embedded development software may present the correspondence data in an embedded browser. If a plurality of application fields include a plurality of application categories, and the plurality of application categories include a plurality of applications, the presentation may be performed in the form of a list in a current project, and a user may select one application from the list.

Further, the embedded development software may alternatively request the server to deliver a list of all available chips and boards, for a user to select. When the user specifies one chip and/or board from the list, a corresponding component is retrieved in the server and downloaded.

The method provided in this embodiment of this specification is applied to a plurality of terminal devices and a server. In embedded development software of the terminal device, application specifying information is input based on an application component, and sent to the server. Access control module of the server accordingly obtains, through retrieval, the application component matching the application specifying information and a resource component on which the application component depends, and sends the application component matching the application specifying information and the resource component on which the application component depends to the embedded development software. In this way, in a project of the embedded development software, the application component and the resource component on which the application component depends are downloaded, without a need to download a redundant resource, thereby improving efficiency of project construction and loading in embedded development.

Figure 9A:
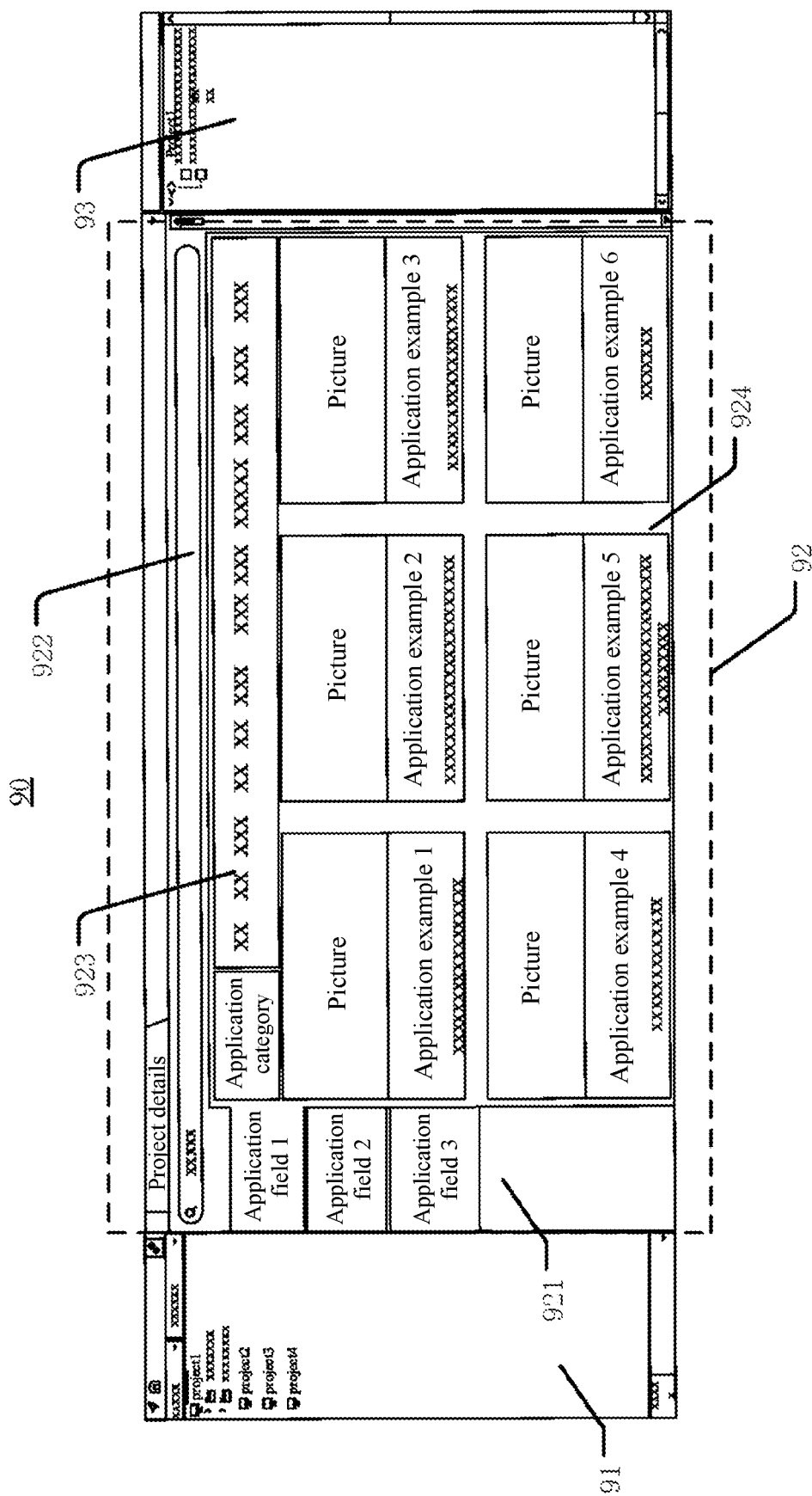
FIG. 9a to FIG. 9c are each a schematic diagram of an interface prototype of example embedded development software, according to an embodiment of this specification.
Figure 9B:
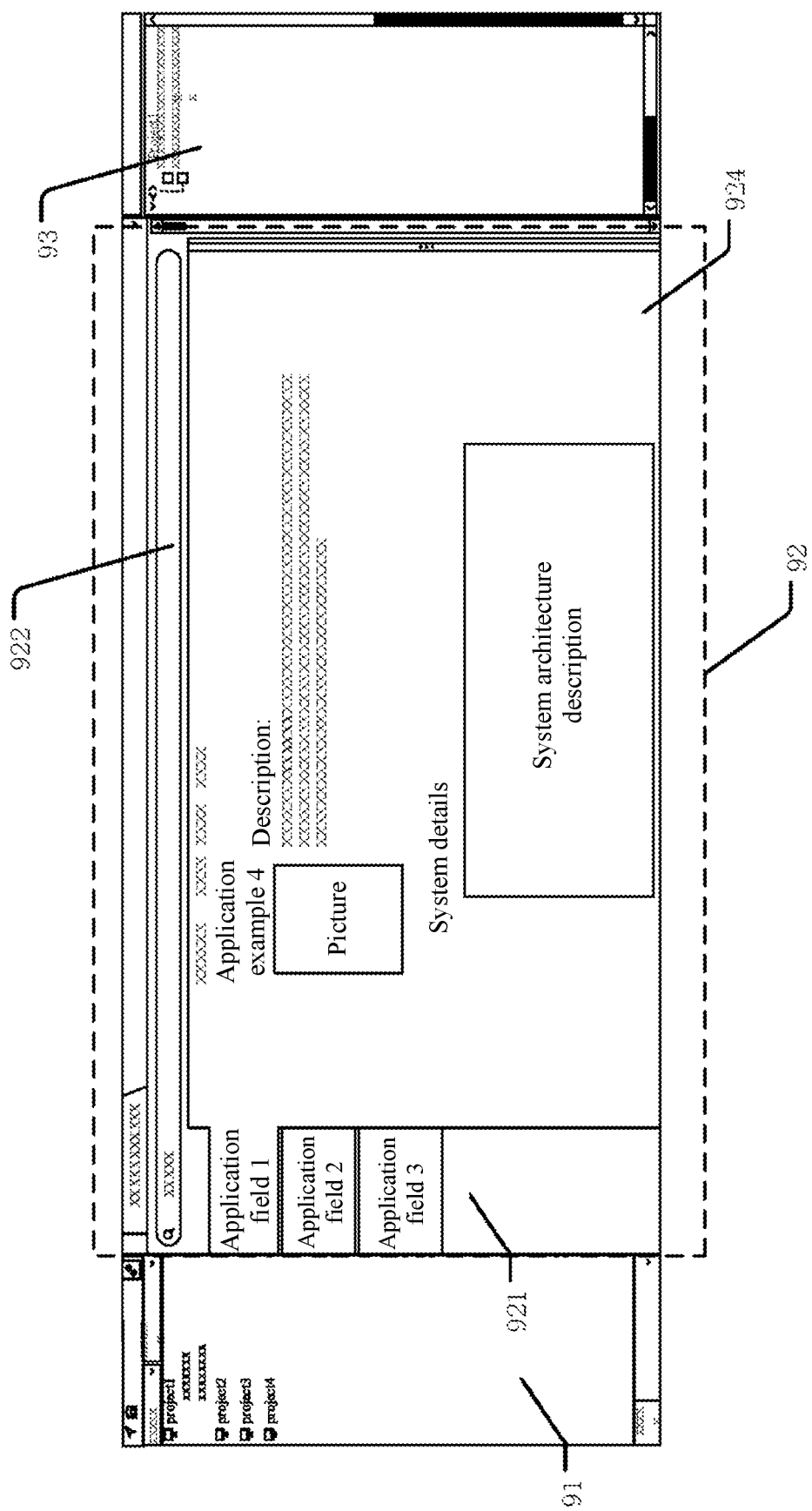
Figure 9C:
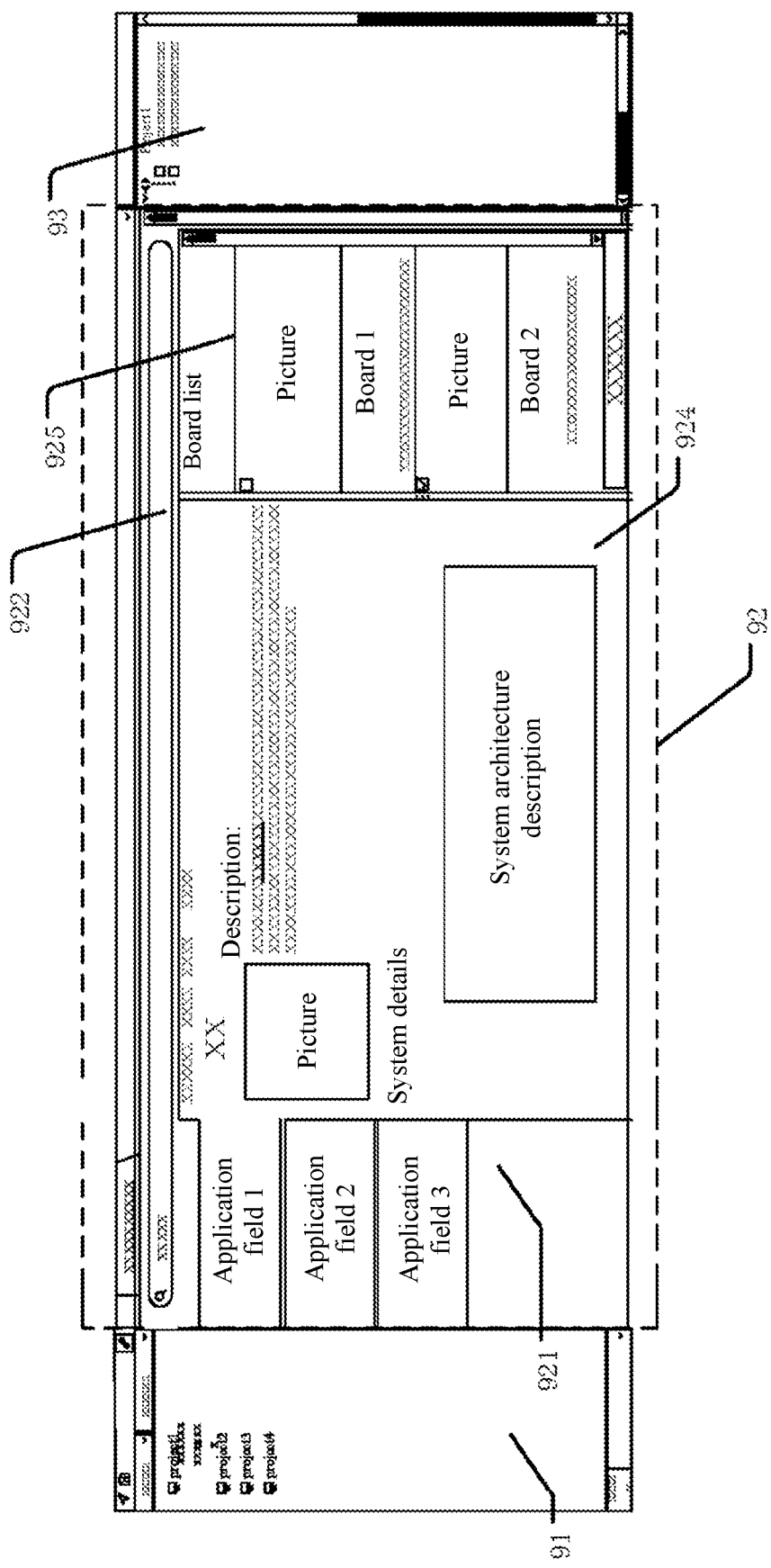

FIG. 9a to FIG. 9c are each a schematic diagram of an interface prototype of example embedded development software, according to an embodiment of this specification.

Referring to FIGS. 9a to 9c, an interface 90 of the embedded development software is divided into a plurality of functional areas. The functional area 91 provides a project view, and lists, through a menu, names of projects that have been created. Application information is displayed in an area 92 marked by a dotted line. In the functional area, a browser may be embedded into a graphic interface by using an embedded technology. An area 93 is a code navigation area. As shown in FIG. 9a, the functional area 92 includes a functional area 921, a functional area 922, a functional area 923, and a functional area 924. The functional area 921 is used to display an application field list. The functional area 922 is used to provide a search term for page search. The functional area 923 is used to display application categories corresponding to application fields. The functional area 924 is used to display a summary and a thumbnail of each application. After constructing a project, an embedded developer selects an application field and an application category, to obtain an application component. As shown in FIG. 9b, the functional area 924 displays detailed information of a specific application component. As shown in FIG. 9c, an area 925 displays a board list that may be used. The board list represents a downloaded board component on which a specific application component depends in a current project, or may represent all available board components currently stored in a server. As described above, there is a correspondence between an application field, an application category, an application identifier, and a board identifier (or a chip identifier may be listed). The correspondence data may be converted into a graphic component in the graphic interface. The embedded development software may initiate an access request to the server, to obtain the correspondence data. The correspondence data may be obtained through one or more access requests from the embedded development software. The embedded development software may initiate the access request at startup, or the embedded development software may download the correspondence data from the server when the correspondence data needs to be obtained. Certainly, the correspondence data may alternatively be constructed in the embedded development software, and then synchronized to embedded development software on another terminal device.

Figure 10:
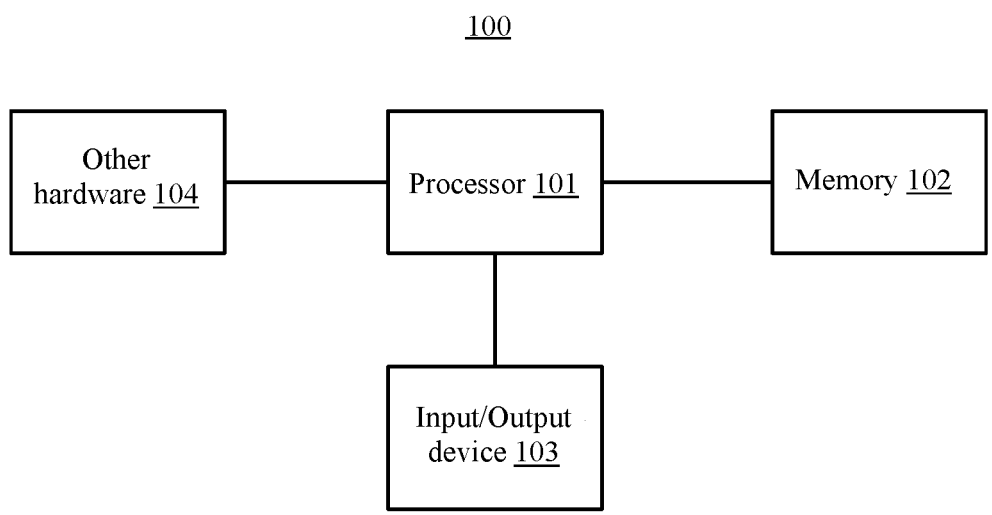
FIG. 10 is a schematic structural diagram of a terminal device and a server, according to an embodiment of this specification.

As shown in FIG. 10, any one of the terminal device 401, the resource server 405, and the control server 404 in FIG. 4 may include a processor 101 and a memory 102 at a hardware level, and in some cases, further include an input/output device 103 and other hardware 104. The memory 102 is, for example, a high speed RAM, or a non-volatile memory, for example, at least one magnetic disk memory. The input/output device 103 is, for example, a display, a keyboard, a mouse, a network controller, or another device. The processor 101 may be constructed based on various models of processors currently on the market. The processor 101, the memory 102, the input/output device 103, and the other hardware 104 are connected to each other through a bus. The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one line is used to represent the bus in FIG. 10, but this does not mean that there is only one bus or only one type of bus.

The memory 102 is configured to store a program. For example, the program may include program code, and the program code includes a computer instruction. The memory may include an internal memory and a non-volatile memory, and provide the computer instruction and data for the processor 101. The processor 101 reads a corresponding computer program from the memory 102 to the internal memory, runs the program to form the foregoing method for providing an IDE at a logical level, and is configured to perform the following operations: receiving application specifying information of an application component through a graphic interface; sending a first access request to the server according to the specified information; and obtains a first application component matching the application specifying information and a resource component on which the first application component depends from the server.

A person skilled in the art may understand that this specification may be implemented as systems, methods, or computer program products. Therefore, this specification may be implemented in the following forms, that is, the form of complete hardware, complete software (including firmware, resident software, and micro code), or may be implemented as a combination of hardware and software. In addition, in some embodiment, this specification may further be implemented as a form of a computer program product in one or more computer-readable mediums, and the computer-readable medium includes computer-readable program code.

Any combination of one or more computer-readable mediums may be used. The computer-readable medium may be a computer-readable signal medium or a computer-readable storage medium. The computer-readable storage medium may be, for example, but not limited to, an electric, magnetic, optical, electromagnetic, infrared, or semi-conductive system, apparatus, or device, or any combination thereof. A more specific example of the computer-readable storage medium includes: an electrical connection having one or more wires, a portable computer magnetic disk, a hard disk, a RAM, a read-only memory (ROM), an erasable programmable read-only memory (EPROM or flash memory), an optical fiber, a compact disk ROM (CD-ROM), an optical storage device, a magnetic storage device, or any appropriate combination thereof. In this specification, the computer-readable storage medium may be any tangible medium containing or storing a program, and the program may be used by or used in combination with a processing unit, an apparatus, or a device.

The computer-readable signal medium may include a data signal being in a baseband or propagated as a part of a carrier, the data signal carrying computer-readable program code. The propagated data signal may be in a plurality of forms, including but not limited to, an electromagnetic signal, an optical signal, or any suitable combination thereof. The computer-readable signal medium may further be any computer-readable medium other than the computer-readable storage medium. The computer-readable medium may send, propagate, or transmit a program that is used by or used in conjunction with an instruction execution system, an apparatus, or a device.

The program code included in the computer-readable medium may be transmitted by using any suitable medium, including but not limited to, wireless transmission, a wire, a cable, radio frequency (RF) or the like, or any suitable combination thereof.

The computer program code configured to perform the embodiments of this specification may be written by using by using one or more programming languages or a combination thereof. The programming languages include an object-oriented programming language such as Java™ and C++, and may also include a conventional procedural programming language such as "C" language. The program code may be completely executed on a user computer, partially executed on a user computer, executed as an independent software package, partially executed on a user computer and partially executed on a remote computer, or completely executed on a remote computer or server. For the case involving a remote computer, the remote computer may be connected to a user computer through any type of network including a local area network (LAN) or a wide area network (WAN), or may be connected to an external computer (for example, through the Internet by using an Internet service provider).

The foregoing descriptions are merely exemplary embodiments of this specification, but are not intended to limit this specification. For a person skilled in the art, various modifications and variations can be made on this specification. Any modification, equivalent replacement, or improvement made within the spirit and principle of this specification shall fall within the protection scope of this specification.

What is claimed is:

1. A computer-implemented method for providing an integrated development environment (IDE) for embedded development, the method comprising:
   storing, by a server, component dependency data describing dependency between each of a plurality of application components and resource components on which the each application component depends, and correspondence data of a plurality of application fields, application categories, and application identifiers;
   receiving, by the server, a first access request from a terminal device;
   parsing, by the server, the first access request to obtain an application identifier;
   retrieving, by the server, an application component based on the application identifier;
   retrieving, by the server based on the component dependency data and the application component, the resource components on which the application component depends,
   wherein the resource components comprise at least one of a board component providing software support for a board or a chip component for initializing a chip on the board;
   downloading, by the server, the application component and the resource components on which the application component depends to the terminal device; and
   updating, by the server, the correspondence data.

2. The method of claim 1, wherein the first access request comprises application specifying information obtained by:
   sending, by the server to the terminal device, the correspondence data for the terminal device to display according to the correspondence data and receive the application specifying information of the application component.

3. The method of claim 2, further comprising:
   receiving, by the server, a second access request from the terminal device for obtaining the correspondence data of the plurality of application fields, application categories, and application identifiers.

4. The method according to claim 3, wherein the receiving a second access request from the terminal device comprises:
   receiving, by the server, the second access request from the terminal device for obtaining the updated correspondence data.

5. The method according to claim 3, wherein the receiving a second access request from the terminal device comprises:
   receiving, by the server, the second access request from the terminal device in real-time for obtaining the correspondence data.

6. The method according to claim 2, further comprising:
   receiving, by the server, a third access request from the terminal device for obtaining data of the board component; and
   sending, by the server, the data of the board component to the terminal device for displaying a plurality of to-be-selected board components according to the data of the board component.

7. The method according to claim 2, further comprising:
   receiving, by the server, a third access request from the terminal device for obtaining data of the chip component; and sending, by the server, the data of the chip component to the terminal device for displaying a plurality of to-be-selected chip components according to the data of the chip component.

8. The method according to claim 1, wherein the resource components on which the application component depends further comprises one or more of the following components: a middleware component and a kernel component.

9. A resource management system comprising one or more processors and one or more non-transitory computer-readable memories coupled to the one or more processors, the one or more non-transitory computer-readable memories storing instructions that, when executed by the one or more processors, cause the system to perform operations comprising:

storing component dependency data describing dependency between each of a plurality of application components and resource components on which the each application component depends, and correspondence data of a plurality of application fields, application categories, and application identifiers;

receiving a first access request from a terminal device;

parsing the first access request to obtain an application identifier;

retrieving an application component based on the application identifier;

retrieving, based on the component dependency data and the application component, the resource components on which the application component depends, wherein the resource components comprise at least one of a board component providing software support for a board or a chip component for initializing a chip on the board;

downloading the application component and the resource components on which the application component depends to the terminal device; and updating the correspondence data.

10. The resource management system of claim 9, wherein the first access request comprises application specifying information obtained by:

sending, to the terminal device, the correspondence data for the terminal device to display according to the correspondence data and receive the application specifying information of the application component.

11. The resource management system of claim 10, wherein the operations further comprise:

receiving a second access request from the terminal device for obtaining the correspondence data of the plurality of application fields, application categories, and application identifiers.

12. The resource management system of claim 11, wherein the receiving a second access request from the terminal device comprises:

receiving the second access request from the terminal device for obtaining the updated correspondence data.

13. The resource management system of claim 11, wherein the receiving a second access request from the terminal device comprises:

receiving the second access request from the terminal device in real-time for obtaining the correspondence data.

14. The resource management system of claim 10, wherein the operations further comprise:

receiving a third access request from the terminal device for obtaining data of the board component; and sending the data of the board component to the terminal device for displaying a plurality of to-be-selected board components according to the data of the board component.

15. The resource management system of claim 10, wherein the operations further comprise:

receiving a third access request from the terminal device for obtaining data of the chip component; and sending the data of the chip component to the terminal device for displaying a plurality of to-be-selected chip components according to the data of the chip component.

16. The resource management system of claim 9, wherein the resource components on which the application component depends further comprise one or more of the following components: a middleware component and a kernel component.

17. A non-transitory computer-readable storage medium storing instructions that, when executed by one or more processors, cause the one or more processors to perform operations comprising:

storing component dependency data describing dependency between each of a plurality of application components and resource components on which the each application component depends, and correspondence data of a plurality of application fields, application categories, and application identifiers;

receiving a first access request from a terminal device;

parsing the first access request to obtain an application identifier;

retrieving an application component based on the application identifier;

retrieving, based on the component dependency data and the application component, the resource components on which the application component depends, wherein the resource components comprise at least one of a board component providing software support for a board or a chip component for initializing a chip on the board;

downloading the application component and the resource components on which the application component depends to the terminal device; and updating the correspondence data.

18. The non-transitory computer-readable storage medium of claim 17, wherein the first access request comprises application specifying information obtained by:

sending, to the terminal device, correspondence data of a plurality of application fields, application categories, and application identifiers for the terminal device to display according to the correspondence data and receive the application specifying information of the application component.

19. The non-transitory computer-readable storage medium of claim 18, wherein the operations further comprise:

receiving a second access request from the terminal device for obtaining the correspondence data of the plurality of application fields, application categories, and application identifiers.

20. The non-transitory computer-readable storage medium of claim 18, wherein the operations further comprise:

receiving a third access request from the terminal device for obtaining data of the board component; and sending the data of the board component to the terminal device for displaying a plurality of to-be-selected board components according to the data of the board component.

* * * * *

UNITED STATES PATENT AND TRADEMARK OFFICE
CERTIFICATE OF CORRECTION

PATENT NO. : 11,372,627 B2
APPLICATION NO. : 17/112923
DATED : June 28, 2022
INVENTOR(S) : Long Jiang et al.

It is certified that error appears in the above-identified patent and that said Letters Patent is hereby corrected as shown below:

In the Claims

Claim 18, Column 18, Lines 45-47:
"sending, to the terminal device, correspondence data of a plurality of application fields, application categories, and application identifiers for the terminal device" should read -- sending, to the terminal device, the correspondence data for the terminal device --.

Signed and Sealed this
Second Day of May, 2023

Katherine Kelly Vidal
*Director of the United States Patent and Trademark Office*